US008871110B2

(12) United States Patent
Guo et al.

(10) Patent No.: US 8,871,110 B2
(45) Date of Patent: Oct. 28, 2014

(54) COMPOSITION GENERATING FIRE EXTINGUISHING SUBSTANCE THROUGH CHEMICAL REACTION OF INGREDIENTS AT HIGH TEMPERATURE

(75) Inventors: Hongbao Guo, Xi'an (CN); Weipeng Zhang, Xi'an (CN); Sanxue Zhang, Xi'an (CN)

(73) Assignee: Xi'An J&R Fire Fighting Equipment Co., Ltd., Shaanxi (CN)

( * ) Notice: Subject to any disclaimer, the term of this patent is extended or adjusted under 35 U.S.C. 154(b) by 0 days.

(21) Appl. No.: 13/824,103

(22) PCT Filed: Sep. 7, 2011

(86) PCT No.: PCT/CN2011/079428

§ 371 (c)(1), (2), (4) Date: Mar. 15, 2013

(87) PCT Pub. No.: WO2012/034493

PCT Pub. Date: Mar. 22, 2012

(65) Prior Publication Data

US 2013/0181157 A1 Jul. 18, 2013

(30) Foreign Application Priority Data

Sep. 16, 2010 (CN) .......................... 2010 1 0285497

(51) Int. Cl.
*A62D 1/06* (2006.01)
*C09K 21/00* (2006.01)

(52) U.S. Cl.
CPC ........................................ *A62D 1/06* (2013.01)
USPC ............ 252/5; 252/4; 252/6; 252/7; 252/605; 169/44; 169/45; 169/46; 169/47

(58) Field of Classification Search
USPC ........ 252/4, 5, 6, 7, 605, 610; 169/44, 45, 46, 169/47
See application file for complete search history.

(56) References Cited

U.S. PATENT DOCUMENTS

| | | | | |
|---|---|---|---|---|
| 2,901,428 | A * | 8/1959 | Schulenburg | 252/7 |
| 3,017,348 | A * | 1/1962 | Schulenburg et al. | 252/2 |
| 4,207,245 | A * | 6/1980 | Halbert | 556/28 |
| 5,055,208 | A * | 10/1991 | Stewart et al. | 252/8 |
| 5,071,076 | A * | 12/1991 | Chagnon et al. | 241/21 |
| 5,423,385 | A * | 6/1995 | Baratov et al. | 169/46 |
| 5,466,386 | A * | 11/1995 | Stewart et al. | 252/2 |
| 5,613,562 | A * | 3/1997 | Galbraith et al. | 169/12 |
| 5,831,209 | A * | 11/1998 | Kozyrev et al. | 149/21 |
| 6,042,664 | A * | 3/2000 | Kozyrev et al. | 149/109.6 |
| 8,652,346 | B2 * | 2/2014 | Guo et al. | 252/5 |
| 2003/0197159 | A1 * | 10/2003 | Kinose et al. | 252/609 |
| 2007/0018143 | A1 * | 1/2007 | Goossens | 252/609 |
| 2010/0179259 | A1 * | 7/2010 | Guo et al. | 524/105 |
| 2010/0187465 | A1 * | 7/2010 | Guo et al. | 252/5 |
| 2013/0175060 | A1 * | 7/2013 | Guo et al. | 169/46 |

FOREIGN PATENT DOCUMENTS

| | | | |
|---|---|---|---|
| CN | 1052880 | A | 7/1991 |
| CN | 1064818 | A | 9/1992 |
| CN | 1222331 | A | 7/1999 |
| CN | 1238226 | A | 12/1999 |
| CN | 1322580 | A | 11/2001 |
| CN | 1481266 | A | 3/2004 |
| CN | 1150952 | C | 5/2004 |
| CN | 1600391 | A | 3/2005 |
| CN | 1695750 | A | 11/2005 |
| CN | 1713935 | A | 12/2005 |
| CN | 1739820 | A | 3/2006 |
| CN | 101327364 | A | 12/2008 |
| CN | 201260858 | Y | 6/2009 |
| CN | 101822883 | A | 9/2010 |
| RU | 2076761 | C1 | 4/1997 |
| RU | 2091106 | C1 | 9/1997 |
| RU | 2108124 | C1 | 4/1998 |
| RU | 2150310 | C1 | 6/2000 |
| RU | 2184587 | C1 | 7/2002 |
| RU | 2214848 | C1 | 2/2004 |
| RU | 2230726 | C2 | 6/2004 |

OTHER PUBLICATIONS

International Search Report for PCT Application No. PCT/CN2011/079428, dated Dec. 15, 2011 (5 pages).
"The Security Analysis of Gas Fire extinguishing System" (Fire Science and Technology 2002 21(5)) 4 pgs.
Office Action dated Oct. 9, 2013 for U.S. Appl. No. 13/824,123, filed Mar. 15, 2013 (14 pgs.).
Office Action dated Oct. 8, 2013 for U.S. Appl. No. 13/824,142, filed Mar. 15, 2013 (14 pgs.).
Linteries et al., "Flame Inhibition by Ferrocene and Blends of Inert and Catalytic Agents," Proceedings of the Combustion Institute, vol. 28, pp. 2965-2972, May 2000.
Linteries et al., "Flame Inhibition by Ferrocene, Alone and with CO2 and CF3H," Halon Options Technical Working Conference, pp. 129-140, May 2000.
Shou et al., "Fire safety analysis of gas fire extinguishing system," 3 pgs., Jun. 2002.

* cited by examiner

*Primary Examiner* — Joseph D Anthony
(74) *Attorney, Agent, or Firm* — Shumaker & Sieffert, P.A.

(57) ABSTRACT

A fire extinguishing composition generating fire extinguishing substance through chemical reaction of ingredients at high temperature, wherein: the fire extinguishing composition comprises a flame retardant, an oxidant, a reducing agent and an adhesive; contents of each ingredient are: the flame retardant: 50 wt % to 90 wt %; the oxidant: 5 wt % to 30 wt %; the reducing agent: 5 wt % to 10 wt %; the adhesive: 0% to 10 wt %. In a usage of the fire extinguishing composition, a pyrotechnic agent is adopted as a heat source and a power source; and the purpose of fire extinguishing is achieved by: igniting the pyrotechnic agent, and the oxidant and the reducing agent in the fire extinguishing composition are reacted to generate the in the use of high temperature produced by burning the pyrotechnic agent. by burning the pyrotechnic agent, so as to implement fire extinguishing. Different from the traditional aerosol generating agent, there is no external heat source, and the composition itself does not burn. Compared with the traditional aerosol generating agent, the fire extinguishing composition of the present invention is more efficient and safer.

13 Claims, No Drawings

COMPOSITION GENERATING FIRE EXTINGUISHING SUBSTANCE THROUGH CHEMICAL REACTION OF INGREDIENTS AT HIGH TEMPERATURE

TECHNICAL FIELD OF THE APPLICATION

The present invention relates to fire-fighting field, relating to the use of a fire extinguishing composition and a chemical fire extinguishing substance, and in particular to a fire extinguishing composition which can generate fire extinguishing substance through chemical reaction at high temperature.

BACKGROUND OF THE INVENTION

Since people found that the Halon fire extinguishing agent can seriously damage the atmospheric ozone layer of the earth, the international community and the Chinese government began to eliminate the Halon fire extinguishing agent; the gas fire extinguishing systems, the powder fire extinguishing systems, the water type fire extinguishing systems and the like, which are environmentally-friendly, are widely used as the substitutes of the Halon fire extinguishing agent.

The fire extinguishing mechanism of an inert gas such as carbon dioxide, IG541 and the like is mainly physical extinguishing, namely, smothering extinguishing by reducing the oxygen concentration of a fire area; such fire extinguishing method is easy to threat the personal safety of workers. The powder fire extinguishing system implements fire extinguishing by the process that the powder spraying under the effect of pressurized gas contacts with the flame to generate physical and chemical inhibition effect. The water spraying fire extinguishing system achieves the purpose of controlling the fire, inhibiting the fire and extinguishing the fire under triple functions of the water mist: cooling, smothering and isolating thermal radiation.

However, these fire extinguishing systems need to be stored under high pressure, not the volume of these systems are larger, but also the risks of physical explosion during the storage process are higher; the document "The Security Analysis of Gas Fire extinguishing System" (Fire Science and Technology 2002 21(5)) analyzes the risks of the gas fire extinguishing system, and enumerates the safety accidents of the storage pressure gas fire extinguishing system.

The aerosol fire extinguishing technology attracts a lot of attention, as it has no toxicity, no corrosion, high volume efficiency, long storage period, total flooding, full range of fire extinguishing and the like; from the end of the last century to the current ten years, the aerosol technology has been rapidly developed, and the related patents are emerged in endlessly. For example, the Russian patents: RU2230726, RU2184587, RU2214848, RU2150310, RU2108124, RU2091106, RU2076761, and the domestic patents: CN1739820A, CN1150952C, CN1222331C.

The disadvantages of the existing aerosol fire extinguishing are that: the fire extinguishing activity generated by itself is seriously attenuated after being filtered by a cooling layer, and the fire extinguishing effectiveness is greatly influenced.

SUMMARY OF THE INVENTION

Aiming at the above research situations, the present invention uses the composition which can generate a fire extinguishing substance through chemical reaction at high temperature in the fire extinguishers. The purpose of the present invention is to provide a fire extinguishing composition which is without high-pressure storage, is safer and environment friendly, and has high efficiency.

The present invention relates to a composition generating fire extinguishing substance through chemical reaction of ingredients at high temperature, wherein: the fire extinguishing composition includes a flame retardant, an oxidant, a reducing agent and an adhesive; the weight percent of each ingredient is: the flame retardant: 50% to 90%; the oxidant: 5% to 30%; the reducing agent: 5% to 10%; the adhesive: 0% to 10%. When in use, a pyrotechnic agent is adopted as a heat source and a power source; by igniting the pyrotechnic agent, the oxidant and the reducing agent in the fire extinguishing composition are reacted to generate an active fire extinguishing substance under the effect of high temperature caused by burning the pyrotechnic agent, so as to implement fire extinguishing.

The flame retardant is one or more of a bromine-based flame retardant, a chlorine-based flame retardant, an organophosphorus-based flame retardant, a phosphorus-halogen based flame retardant, a nitrogen-based and phosphorus-nitrogen based flame retardant or an inorganic flame retardant.

The bromine-based flame retardant includes tetrabromobisphenol A, tetrabromobisphenol A ether, 1,2-bis(tribromophenoxy)ethane, 2,4,6-tribromophenyl glycidyl ether, tetrabromophthalic anhydride, N,N-ethylene-bis (tetrabromophthalimide), dimethyl 4-bromophthalate, tetrabromo phthalic disodium, decabromodiphenyl ether, 1,4-Bis(pentabromophenoxy)tetrabromobenzene (ie, DBDPOB), 1,2-bis(pentabromophenyl) ethane, bromo trimethylphenyl indane (ie, BTMPI), pentabromobenzyl acrylate, pentabromobenzyl bromide, hexabromo-benzene, pentabromotoluene, 2,4,6-tribromophenyl maleic imide, hexabromocyclododecane, N,N'-1,2-bis(ethylene-bis(5,6-dibromonorbomane-2,3-dicarboximide) (ie, DEDBFA), pentabromo chlorocyclohexane, tri(2,3-dibromopropyl) isomelamine ester, brominated styrene copolymer, tetrabromobisphenol A carbonate oligomer, poly(pentabromobenzyl acrylate) (ie, PPBBA), poly(dibromo phenylene ether).

The chlorine-based flame retardant includes chlorendic anhydride, perchloropentacyclodecan, tetrachlorobisphenol A, tetrachlorophthalic anhydride, hexachlorobenzene, chlorinated polypropylene, chlorinated polyvinyl chloride, vinyl chloride-vinylidene chloride copolymer, chlorinated polyether, hexachloroethane.

The organophosphorus-based flame retardant includes 1-oxo-4-hydroxymethyl-2,6,7-trioxa-1-phosphorus heterobicyclo[2,2,2]octane, 2,2-dimethyl-1,3-propanediyl-bis (neopentyl glycolato) bisphosphate, 9,10-dihydro-9-oxa-10-phosphaphenanthrene-10 oxide, bis(4-carboxyphenyl) phenyl phosphine oxide, bis(4-hydroxyphenyl) phenyl phosphine oxide, phenyl phosphate diphenyl sulfone ester oligomer.

The phosphorus-halogen based flame retardant includes tri(2,2-bis(bromomethyl)-3-bromopropyl) phosphate, tri(dibromophenyl) phosphate, 3,9-bis(tribromophenoxy)-2,4,8,10-tetroxa-3,9-diphosphaspiro ring[5,5]-3,9-dioxide undecane, 3,9-bis(pentabromophenoxy)-2,4,8,10-tetroxa-3,9-diphosphaspiro ring[5,5]-3,9-dioxide undecane, 1-oxo-4-tribromophenyl oxycarbonyl-2,6,7-trioxa-1-phosphabicyclo [2,2,2]octane, p-phenylene tetra(2,4,6-tribromophenyl) bisphosphate, 2,2-bis(chloromethyl)-1,3-propanediyl-bis (neopentyl glycolato) bisphosphate, 2,9-bis(tribromo neopentyloxy)-2,4,8,10-tetroxa-3,9-diphosphaspiro ring[5,5]-3,9-dioxide undecane.

The nitrogen-based and phosphorus-nitrogen based flame retardant includes melamine cyanurate, melamine phosphate salt, dimelamine orthophosphate, melamine polyphosphate, melamine borate, melamine octamolybdate, cyanuric acid, tri-hydroxyethyl isocyanurate, 2,4-diamino-6-(3,3,3-trichloropropyl)-1,3,5-triazine, 2,4-bis(N-hydroxymethylamino)-6-(3,3,3-trichloropropyl-1,3,5-triazine), guanidine phosphate dibasic, guanidinium dihydrogen phosphate, guanidine carbonate, guanidine sulfamate, urea, urea dihydrogen phosphate, dicyandiamide, bis(2,6,7-trioxa-1-phosphabicyclo [2,2,2]octane-1-oxy-4-methyl) hydroxy phosphate melamine, 3,9-dihydroxy-3,9-dioxy-2,4,8,10-tetroxa-3,9-diphosphaspiro ring[5,5]undecane-3,9-dimelamine, 1,2-bis (2-oxy-5,5-dimethyl-1,3-dioxa-2-phosphorus heterocyclic hexyl-2-amino)ethane, N,N'-bis(2-oxy-5,5-dimethyl-1,3-dioxa-2-phosphorus heterocyclic hexyl)-2,2'-m-phenylenediamine, tri(2-oxy-5,5-dimethyl-1,3-dioxa-2-heterocyclic hexyl-2-methyl) amine or phosphonitrilic chloride trimer.

The inorganic fire extinguishing material includes ammonium polyphosphate, diammonium hydrogen phosphate, ammonium dihydrogen phosphate, zinc phosphate, aluminium phosphate, boron phosphate, antimony trioxide, aluminium hydroxide, magnesium hydroxide, hydromagnesite, alkaline aluminum oxalate, zinc borate, barium metaborate, zinc oxide, zinc sulfide, zinc sulfate heptahydrate, aluminum borate whisker, ammonium octamolybdate, ammonium heptamolybdate, zinc stannate, tin oxide, tin dioxide, ferrocene, ferric acetone, ferric oxide, ferroferric oxide, ammonium bromide, sodium tungstate, potassium hexafluoro titanate, potassium hexafluoro zirconate, titanium dioxide, calcium carbonate, barium sulfate, sodium bicarbonate, potassium bicarbonate, cobalt carbonate, zinc carbonate, basic zinc carbonate, heavy magnesium carbonate, basic magnesium carbonate, manganese carbonate, ferrous carbonate, strontium carbonate, potassium sodium carbonate hexahydrate, magnesium carbonate, calcium carbonate, dolomite, basic copper carbonate, zirconium carbonate, beryllium carbonate, sodium sesquicarbonate, cerous carbonate, lanthanum carbonate, guanidine carbonate, lithium carbonate, scandium carbonate, vanadium carbonate, chromium carbonate, nickel carbonate, yttrium carbonate, silver carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, lutecium carbonate, aluminum hydroxyacetate, calcium acetate, sodium bitartrate, sodium acetate, potassium acetate, zinc acetate, strontium acetate, nickel acetate, copper acetate, sodium oxalate, potassium oxalate, ammonium oxalate, nickel oxalate, manganese oxalate dihydrate, iron nitride, zirconium nitrate, calcium dihydrogen phosphate, sodium dihydrogen phosphate, sodium dihydrogen phosphate dihydrate, monopotassium phosphate, aluminium dihydrogen phosphate, ammonium dihydrogen phosphate, zinc dihydrogen phosphate, manganese dihydrogen phosphate, magnesium dihydrogen phosphate, disodium hydrogen phosphate, diammonium hydrogen phosphate, calcium hydrogen phosphate, magnesium hydrogen phosphate, ammonium phosphate, magnesium ammonium phosphate, ammonium polyphosphate, potassium metaphosphate, potassium tripolyphosphate, sodium trimetaphosphate, ammonium hypophosphite, ammonium orthophosphite di-hydrogen, manganese phosphate, di-zinc hydrogen phosphate, dimanganese hydrogen phosphate, guanidine phosphate, melamine phosphate salt, urea phosphate, hydrogen phosphate metaborate strontium, potassium, boric acid, ammonium pentaborate, potassium tetraborate.$8H_2O$, magnesium metaborate.$8H_2O$, ammonium tetraborate.$4H_2O$, strontium metaborate, strontium tetraborate, strontium tetraborate.$4H_2O$, sodium tetraborate.$10H_2O$, manganese borate, zinc borate, ammonium fluoroborate, ammonium ferrous sulfate, aluminum sulfate, aluminium potassium sulfate, aluminum ammonium sulfate, ammonium sulfate, magnesium hydrogen sulfate, aluminium hydroxide, magnesium hydroxide, ferric hydroxide, cobalt hydroxide, bismuth hydroxide, strontium hydroxide, cerium hydroxide, lanthanum hydroxide, molybdenum hydroxide, ammonium molybdate, zinc stannate, magnesium trisilicate, telluric acid, manganese tungstate, manganite, cobaltocene.

The fire extinguishing material also can be 5-aminotetrazole, azodicarbonamide, nylon powder, oxamide, biuret, pentaerythritol, decabromodiphenyl ether, tetrabromophthalic anhydride, dibromoneopentyl glycol, potassium citrate, sodium citrate, manganese citrate, magnesium citrate, copper citrate or ammonium citrate.

The oxidant is one or more of sodium nitrate, magnesium nitrate, iron oxide, barium nitrate, strontium nitrate and potassium nitrate.

The reducing agent is one or more of magnesium, carbon, aluminium, iron, guanidine nitrate, nitroguanidine and melamine.

The adhesive is one or more of sodium silicate, phenolic resin, shellac and starch.

During the production, the fire extinguishing composition of the present invention can be processed to be required shapes, such as spherical, flake-like, strip-like, block-like and cellular, and can be implemented with the surface coating treatment.

The fire extinguishing mechanism of the fire extinguishing composition is as follows: the pyrotechnic agent can release a lot of heat after being ignited, thus, the oxidant and the reducing agent in the fire extinguishing composition are implemented with an oxidation-reduction reaction to generate a large number of active fire extinguishing substances to extinguish the fire. However, different from the conventional aerosol generating agent, because there are a large number of flame retardants, the composition itself cannot burn if there's no external heat source. The present invention can provide a fire extinguishing composition which is more efficient and safer than the traditional aerosol generating agent.

DETAILED DESCRIPTION OF THE EMBODIMENTS

Respectively adding 30 g of the prepared flake-like fire extinguishing composition in the fire extinguishing device which is filled with 20 g of the K type thermal aerosol generating agent, and respectively implementing a distributing fire extinguishing tests in a 1.0 $m^3$ test box; the test result is as shown in Table 1. The comparison embodiment selects 20 g of commercial K type thermal aerosol generating agent.

TABLE 1

Ingredient and test result comparison

| Ingredient name | Weight percent of ingredient NO. 1 | NO. 2 | NO. 3 | NO. 4 | NO. 5 | NO. 6 | NO. 7 | Comparison embodiment |
|---|---|---|---|---|---|---|---|---|
| Ammonium dihydrogen phosphate | 62 | | | | | | 59 | 20 g of commercial K type thermal aerosol generating agent |
| Diammonium hydrogen phosphate | | | 60 | | | | | |
| Melamine phosphate salt | | | | 58 | 64 | | | |
| Melamine | 10 | 9 | 8 | | | | | |
| Tetrabromobisphenol A | | 65 | | | | 63 | | |
| Phenolic aldehyde | | 7 | | 7 | | | | |
| iron oxide | | | | | | | 20 | |
| Carbon | | | 2 | 7 | | 4 | | |
| Magnesium nitrate | 20 | | | | | | 5 | |
| Potassium nitrate | | 19 | 25 | | 18 | | | |
| Magnesium | | | | 3 | 8 | | 8 | |
| Aluminium | | | | | 2 | 4 | | |
| Sodium silicate | 8 | | | | 8 | 5 | | |
| Shell-lac | | | 5 | | | | 8 | |
| Sodium nitrate | | | | 25 | | 24 | | |
| Test result comparison | | | | | | | | |
| Fire extinguishing situation | 4 fire extin-guished | 4 fire extin-guished | 5 fire extin-guished | 4 fire extin-guished | 5 fire extin-guished | 4 fire extin-guished | 3 fire extin-guished | 2 fire extin-guished |

According to the test data in the above table, it can see that the fire extinguishing performances of the fire extinguishing compositions of the embodiments 1-7 of the present invention are all superior to the 20 g of commercial K type thermal aerosol generating agent when implementing a distributing fire extinguishing test in the 1.0 $m^3$ test box.

The experimental method is based on the concentration distribution test method of 7.13 in GA 499-2004, the fire extinguishing test is implemented in the 1 $m^3$ test box; five test tanks are put in the test box; the four fuel tanks are put in four corners of the experimental spaces, which are staggered up and down in pairs; in addition, a fuel tank is put at the bottom of the experimental space behind a baffle plate. N-heptane is filled in the fuel tank.

What is claimed is:

1. A fire extinguishing composition which generates fire extinguishing substance through chemical reaction of ingredients at high temperature, wherein the fire extinguishing composition comprises:

a pyrotechnic agent, a flame retardant, an oxidant, a reducing agent and an adhesive, wherein contents of each ingredient of the fire extinguishing composition are:

the flame retardant: 50 wt % to 90 wt %, the oxidant: 5 wt % to 30 wt %, the reducing agent: about 5 wt % to 10 wt %, and the adhesive: 0% to 10 wt %, wherein the pyrotechnic agent is adopted as a heat source and a power source in a process of fire extinguishing, wherein fire extinguishing is achieved by:

igniting the pyrotechnic agent, and the oxidant and the reducing agent of the fire extinguishing composition are reacted to generate a fire extinguishing active substance in the use of high temperature produced by burning the pyrotechnic agent.

2. The fire extinguishing composition according to claim 1, wherein the flame retardant in the fire extinguishing composition includes a bromine-based flame retardant, a chlorine-based flame retardant, an organophosphorus-based flame retardant, a phosphorus-halogen based flame retardant, a nitrogen-based and phosphorus-nitrogen based flame retardant or an inorganic flame retardant.

3. The fire extinguishing composition according to claim 2, wherein the bromine-based flame retardant includes tetrabromobisphenol A, tetrabromobisphenol A ether, 1,2-bis(tribromophenoxy)ethane, 2,4,6-tribromophenyl glycidyl ether, tetrabromophthalic anhydride, N,N-ethylene-bis (tetrabromophthalimide), dmethyl 4-bromophthalate, tetrabromo phthalic disodium, decabromodiphenyl ether, 1,4-Bis(pentabromophenoxy)tetrabromobenzene, 1,2-bis (pentabromophenyl)ethane, bromo trimethylphenyl indane, pentabromobenzyl acrylate, pentabromodiphenyl benzyl bromide, hexabromo-benzene, pentabromotoluene, 2,4,6-tribromophenyl maleic imide, hexabromocyclododecane, N,N'-1,2-bis(ethylene-bis(5,6-dibromonorbornane-2,3-dicarboximide), pentabromo chlorocyclohexane, tri(2,3-dibromopropyl)iso-melamine ester, brominated styrene copolymer, tetrabromobisphenol A carbonate oligomer, poly (pentabromobenzyl acrylate) or poly(dibromo phenylene ether).

4. The fire extinguishing composition according to claim 2, wherein the chlorine-based flame retardant includes dechlorane plus, chlorendic anhydride, perchloropentacyclodecan, tetrachlorobisphenol A, tetrachlorophthalic anhydride, hexachlorobenzene, chlorinated polypropylene, chlorinated polyvinyl chloride, vinyl chloride-vinylidene chloride copolymer, chlorinated polyether or hexachloroethane.

5. The fire extinguishing composition according to claim 2, wherein the organophosphorus-based flame retardant includes 1-oxo-4-hydroxymethyl-2,6,7-trioxa-1-phosphorus heterobicyclo[2,2,2]octane, 2,2-dimethyl-1,3-propanediyl-bis(neopentyl glycolato) bisphosphate, 9,10-dihydro-9-oxa-10-phosphaphenanthrene-10 oxide, bis(4-carboxyphenyl) phenyl phosphine oxide, bis(4-hydroxyphenyl)phenyl phosphine oxide or phenyl phosphate diphenyl sulfone ester oligomer.

6. The fire extinguishing composition according to claim 2, wherein the phosphorus-halogen based flame retardant includes tri(2,2-bis(bromomethyl)-3-bromopropyl)phosphate, tri(dibromophenyl)phosphate, 3,9-bis(tribromophenoxy)-2,4,8,10-tetroxa-3,9-diphosphaspiro ring[5,5]-3,9-dioxide undecane, 3,9-bis(pentabromophenoxy)-2,4,8,10-tetroxa-3,9-diphosphaspiro ring[5,5]-3,9-dioxide undecane, 1-oxo-4-tribromophenyl oxycarbonyl-2,6,7-trioxa-1-phosphorus heterobicyclo[2,2,2]octane, p-phenylene tetra(2,4,6-tribromophenyl)bisphosphate, 2,2-bis(chloromethyl)-1,3-propanediyl-bis(neopentyl glycolato) bisphosphate or 2,9-bis(tribromo neopentyloxy)-2,4,8,10-tetroxa-3,9-diphosphaspiro ring[5,5]-3,9-dioxide undecane.

7. The fire extinguishing composition according to claim 2, wherein the nitrogen-based and phosphorus-nitrogen based flame retardant includes melamine cyanurate, melamine phosphate salt, dimelamine orthophosphate, melamine polyphosphate, melamine borate, melamine octamolybdate, cyanuric acid, tri-hydroxyethyl isocyanurate, 2,4-diamino-6-(3,3,3-trichloropropyl)-1,3,5-triazine, 2,4-bis(N-hydroxymethylamino)-6-(3,3,3-trichloropropyl-1,3,5-triazine), guanidine phosphate dibasic, guanidinium dihydrogen phosphate, guanidine carbonate, guanidine sulfamate, urea, urea dihydrogen phosphate, dicyandiamide, bis (2,6,7-trioxa-1-phosphabicyclo [2,2,2]octane-1-oxy-4-methyl)hydroxy phosphate melamine, 3,9-dyhydroxy-3,9-dioxy-2,4,8,10-tetroxa-3,9-diphosphaspiro ring[5,5] undecane-3,9-dimelamine, 1,2-bis(2-oxy-5,5-dimethyl-1,3-dioxa-2-phosphorus heterocyclic hexyl-2-amino)ethane, N,N'-bis(2-oxy-5,5-dimethyl-1,3-dioxa-2-phosphorus heterocyclic hexyl)-2,2'-m-phenylenediamine, tri(2-oxy-5,5-dimethyl-1,3-dioxa-2-heterocyclic hexyl-2-methyl)amine or phosphonitrilic chloride trimer.

8. The fire extinguishing composition according to claim 2, whereinthe inorganic flame retardant is ammonium polyphosphate, diammonium hydrogen phosphate, ammonium dihydrogen phosphate, zinc phosphate, aluminium phosphate, boron phosphate, antimony trioxide, aluminium hydroxide, magnesium hydroxide, hydromagnesite, alkaline aluminum oxalate, zinc borate, barium metaborate, zinc oxide, zinc sulfide, zinc sulfate heptahydrate, aluminum borate whisker, ammonium octamolybdate, ammonium heptamolybdate, zinc stannate, tin oxide, tin dioxide, ferrocene, ferric acetone, ferric oxide, ferroferric oxide, ammonium bromide, sodium tungstate, potassium hexafluoro titanate, potassium hexafluoro zirconate, titanium dioxide, calcium carbonate, barium sulfate, sodium bicarbonate, potassium bicarbonate, cobalt carbonate, zinc carbonate, basic zinc carbonate, heavy magnesium carbonate, basic magnesium carbonate, manganese carbonate, ferrous carbonate, strontium carbonate, potassium sodium carbonate.hexahydrate, magnesium carbonate, calcium carbonate, dolomite, basic copper carbonate, zirconium carbonate, beryllium carbonate, sodium sesquicarbonate, cerous carbonate, lanthanum carbonate, guanidine carbonate, lithium carbonate, scandium carbonate, vanadium carbonate, chromium carbonate, nickel carbonate, yttrium carbonate, silver carbonate, praseodymium carbonate, neodymium carbonate, samarium carbonate, europium carbonate, gadolinium carbonate, terbium carbonate, dysprosium carbonate, holmium carbonate, erbium carbonate, thulium carbonate, ytterbium carbonate, lutecium carbonate, aluminum hydroxyacetate, calcium acetate, sodium bitartrate, sodium acetate, potassium acetate, zinc acetate, strontium acetate, nickel acetate, copper acetate, sodium oxalate, potassium oxalate, ammonium oxalate, nickel oxalate, manganese oxalate dihydrate, iron nitride, zirconium nitrate, calcium dihydrogen phosphate, sodium dihydrogen phosphate, sodium dihydrogen phosphate dihydrate, monopotassium phosphate, aluminium dihydrogen phosphate, ammonium dihydrogen phosphate, zinc dihydrogen phosphate, manganese dihydrogen phosphate, magnesium dihydrogen phosphate, disodium hydrogen phosphate, diammonium hydrogen phosphate, calcium hydrogen phosphate, magnesium hydrogen phosphate, ammonium phosphate, magnesium ammonium phosphate, ammonium polyphosphate, potassium metaphosphate, potassium tripolyphosphate, sodium trimetaphosphate, ammonium hypophosphite, ammonium orthophosphite di-hydrogen, manganese phosphate, zinc phosphate monobasic, manganese phosphate dibasic, guanidine phosphate, melamine phosphate salt, urea phosphate, hydrogen phosphate metaborate strontium, potassium, boric acid, ammonium pentaborate, potassium tetraborate.$8H_2O$, magnesium metaborate.$8H_2O$, ammonium tetraborate.$4H_2O$, strontium metaborate, strontium tetraborate, strontium tetraborate.$4H_2O$, sodium tetraborate.$10H_2O$, manganese borate, zinc borate, ammonium fluoroborate, ammonium ferrous sulfate, aluminum sulfate, aluminium potassium sulfate, aluminum ammonium sulfate, ammonium sulfate, magnesium hydrogen sulfate, aluminium hydroxide, magnesium hydroxide, ferric hydroxide, cobalt hydroxide, bismuth hydroxide, strontium hydroxide, cerium hydroxide, lanthanum hydroxide, molybdenum hydroxide, ammonium molybdate, zinc stannate, magnesium trisilicate, telluric acid, manganese tungstate, manganite, cobaltocene or other combinations.

9. The fire extinguishing composition according to claim 1, wherein the flame retardant comprises 5-aminotetrazole, azodicarbonamide, nylon powder, oxamide, biuret, pentaerythritol, decabromodiphenyl ether, tetrabromophthalic anhydride, dibromoneopentyl glycol, potassium citrate, sodium citrate, manganese citrate, magnesium citrate, copper citrate or ammonium citrate.

10. The fire extinguishing composition according to claim 1, wherein the oxidant in the fire extinguishing composition is one or more of sodium nitrate, magnesium nitrate, iron oxide, barium nitrate, strontium nitrate and potassium nitrate.

11. The fire extinguishing composition according to claim 1, wherein the reducing agent in the fire extinguishing composition is one or more of magnesium, carbon, aluminium, iron, guanidine nitrate, nitroguanidine and melamine.

12. The fire extinguishing composition according to claim 1, wherein the adhesive is one or more of sodium silicate, phenolic resin, shellac and starch.

13. The fire extinguishing composition according to claim 1, wherein the pyrotechnic agent is a pyrotechnic aerosol fire extinguishing agent.

* * * * *